May 19, 1964     D. GILETTA ETAL     3,134,079
TIRE BUILDING MACHINE HAVING AXIALLY ADJUSTABLE BEAD SEATS
Filed April 20, 1960
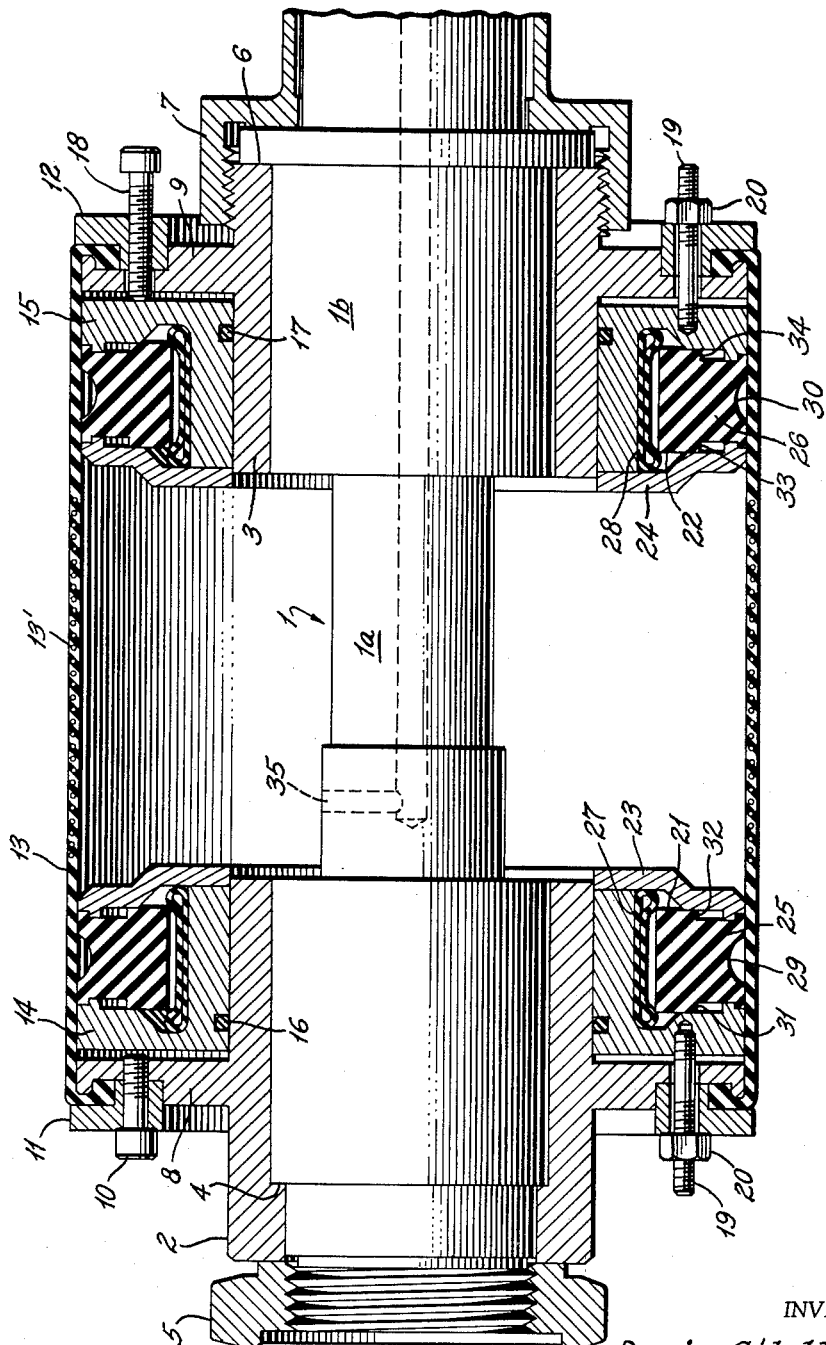
INVENTORS
*Dario Giletta*
*& Antonio Pacciarini*
BY *Stevens, Davis, Miller & Mosher*
ATTORNEYS 3,134,079
TIRE BUILDING MACHINE HAVING AXIALLY ADJUSTABLE BEAD SEATS
Dario Giletta and Antonio Pacciarini, Milan, Italy, assignors to Pirelli S.p.A., Milan, Italy
Filed Apr. 20, 1960, Ser. No. 23,481
Claims priority, application Italy Apr. 24, 1959
3 Claims. (Cl. 156—416)

The present invention relates to a tire building machine of the type having a pair of circumferentially expansible bead seats mounted, respectively, in a pair of disc-shaped side walls which are mounted in parallel and concentric relation and which are movable axially towards and away from each other. More particularly, the present invention pertains to the mounting of the bead seats in such a manner that each bead seat is axially movable with respect to its associated side wall.

As it is known to those skilled in the art, certain pneumatic tires of a special type can be built up on a drum comprising two disc-shaped side walls and a tubular diaphragm of extensible material, suitably reinforced, which covers the side walls and which is anchored in air-tight relation to the outer faces of the side walls.

The two side walls are assembled in spaced and parallel relation on the main shaft of the building machine. The main shaft is composed of two shaft portions telescopically slidable with respect to each other in such a manner that the side walls are movable towards or away from a reference plane which is located midway between, and parallel to, the side walls. In the periphery of each side wall there is a circular groove which encases an expansible ring (forming a bead seat) together with a corresponding inflatable air tube underlying the ring.

Compressed air can be introduced into the space enclosed between the side walls and the diaphragm in order to expand the latter. In such a way the diaphragm can assume two well-defined limiting shapes: (1) a cylindrical shape having a diameter not greater than the diameter of the two side walls when the enclosed space inside the drum is in communication with the atmosphere, and (2) another cylindrical shape having a diameter greater than that of the two side walls when the space inside the drum is placed in communication with a source of compressed air.

At the beginning of the tire building operation on a drum of this kind, the diaphragm is brought to its smaller diameter. The space inside the drum is in communication with the atmosphere and the two side walls are mutually spaced apart so as to stretch the diaphragm covering them in order to facilitate the contraction of the diaphragm to its smaller diameter and to impart to the diaphragm the stiffness necessary for withstanding the stresses to which it is subjected during the manufacturing operations; in general, the diaphragm is so reinforced as to be inextensible in the longitudinal direction, namely, in a direction parallel to the axis of rotation.

The carcass plies are then wound on the drum, and the two bead wires, which will form the reinforcement of the two beads of the tire, are superimposed on the plies. These two bead wires are slipped along the drum until they are centered, respectively, above the two grooves provided in the peripheries of the expansible rings. Compressed air is then introduced into the inflatable air tubes so as to push the expansible rings radially outwardly against the diaphragm with the result that the carcass plies are compressed, or gripped, between the bead wires and the ends of the diaphragm.

The pressure exerted by these expansible rings on the two bead wires is very strong and, therefore, the two ends of the expansible diaphragm are held in air-tight relation against the bead wires. The diaphragm now may be expanded by introducing compressed air into the space enclosed between the side walls and the diaphragm and by simultaneously moving the two side walls slightly towards each other for a predetermined amount. The two resulting rounded connections formed at the two ends of the cylindrical portion thus become tangent to the two bead wires (not to the outer faces of the side walls where the diaphragm is anchored as said above).

Continuing with the tire building operation, the ends of the carcass plies which project laterally beyond the bead wires are turned up about the bead wires and are caused to adhere to the part of the plies existing between the bead wires. Then other reinforcing elements, necessary to finish the tire, are applied.

It is evident that the distance between the two grooves provided on the peripheries of the expansible rings determines the length of the plies comprised between the bead wires and, consequently, the development of the generatrix corresponding to the inner profile of the tire being made. It follows that, by varying the tire size, also said development must vary, and since, in the drums heretofore used, the distance between the two anchorages of the diaphragm and the midline of the two expansible rings is fixed and predetermined, tires of various size would thus require diaphragms of different length.

Therefore, it is a principal object of the present invention to provide improvements in the above described building drums which will permit the construction of tires of different sizes varying within certain limits while using the same expansible diaphragm (of constant length).

It is a more particular object of the present invention to provide, in each side wall, a mounting means for each expansible ring or bead seat which will permit adjustment of each bead seat in an axial direction relative to its associated side wall.

Other and further objects and advantageous features of this invention will hereinafter appear more clearly from the following description, made with reference to the drawing, which represents the building drum in longitudinal section.

On a shaft 1, composed of two shaft portions 1a and 1b telescopically slidable with respect to each other, there are mounted two sleeves 2 and 3, the first of which is fastened to one of the two shaft portions against the ledge 4 by means of the threaded nut 5 and the second of which is fastened to the other shaft portion against the ledge 6 by means of the threaded locking nut 7.

The two sleeves 2 and 3 are respectively provided with flanges 8 and 9, to which rings 11 and 12, respectively, are secured by means of screws 10. Although only one such screw 10 is shown in the drawing (in relation to ring 11) for the sake simplicity, it should be understood that a plurality of screws 10 are suitably and circumferentially spaced around both rings 11 and 12. The thickened edges of a reinforced tubular diaphragm 13 are clamped, in suitable annular grooves, between the ring 11 and the flange 8 and between the ring 12 and the flange 9. The tubular diaphragm 13 is reinforced by means of textile or metallic thread elements generally designated by the reference character 13' and preferably disposed in two directions perpendicular to each other, namely, (1) in a longitudinal direction parallel to the axis of rotation and along the whole length of the diaphragm and (2) in a crossed or circumferential direction, normal to the axis of rotation, limited to a zone in the central part of the diaphragm.

The diaphragm 13 referred to above forms no part of the present invention except insofar as the same is associated in the general combination disclosed and is described in greater detail in co-pending application Serial No. 781,137 filed on December 17, 1958, with particular reference to FIGURE 5 of that application. The two sleeves 2 and 3 together with their flanges 8 and 9 and rings 11 and 12, respectively, comprise the two side walls referred to herein to which the tubular diaphragm 13 has its ends anchored in fluid tight relation as described above.

A pair of solid rings 14 and 15 are slidably mounted on the sleeves 2 and 3, respectively, and are sealed with respect thereto by means of gaskets or O-rings 16 and 17, respectively.

On the flanges 8 and 9, in alternate relation with the screws 10, there are mounted set screws 18 and draw screws 19. The latter are locked in the rings 14 and 15, passing through suitable holes provided in the rings 11 and 12. Draw nuts 20 are mounted on the outer threaded ends of the draw screws 19. These series of screws are provided to vary at will the distance between the slidable rings 14 and 15 and the flanges 8 and 9.

Two additional solid rings 23 and 24 are fastened to the rings 14 and 15 (by means of screws not represented in the drawing) so as to form two resulting seats 21 and 22, respectively. These seats encase two expansible rings 25 and 26 made of elastic material and the corresponding inflatable air tubes 27 and 28, respectively. At the periphery of the expansible rings 25 and 26 there are the grooves 29 and 30 and on their sides the cylindrical surfaces 31 and 32 and 33 and 34 which, constituting ledges against suitable opposing surfaces obtained in the seats 21 and 22, limit the expansion of the two rings 25 and 26 when these are not yet locked against the bead wires of the tire being built up.

An air intake, passing through the shaft 1, allows the introduction of compressed air into the space enclosed between the side walls 8 and 9 and the diaphragm 13 through the opening 35.

In order to build up a tire on the above described drum, the following steps are carried out:

The two sleeves 2 and 3 are mutually spaced apart by actuating the device of the building machine which causes the shaft portions carrying the sleeves to slide telescopically with respect to each other, and therefore the two flanges 8 and 9 are also mutually spaced apart so as to stretch the diaphragm 13 and to place under tension its longitudinal inextensible reinforcement. Then the two slidable rings 14 and 15 are moved towards or away from their flanges 8 and 9 by adjusting the screws 18 and the nuts 20 to bring the midline of the grooves 29 and 30 to a mutual distance corresponding to the desired development of the internal generatrix of the tire being built up, measured between the two bead wires.

The rubberized carcass plies are then wound on the drum, the two bead wires are superimposed on the plies by placing them over the midlines of the respective grooves 29 and 30, compressed air is introduced into the two air tubes 27 and 28 to expand the elastic rings 25 and 26. Thereafter, compressed air is introduced into the inner space of the drum, and the two side walls 2 and 3 are moved towards each other for a predetermined amount while the diaphragm expands. The ends of the carcass plies projecting beyond the bead wires are turned up about the latter to cause them to adhere to the central portion of the plies. The tire is then finished by applying all the further elements which complete it.

As the distance between the midline of the two expansible rings can be varied as desired, even maintaining unvaried the distance between the two side walls 2 and 3, the same diaphragm can be used, within certain limits, for the manufacture of tires in which one can change the length of the generatrix of their inner profile measured from bead wire to bead wire.

Obviously the present invention is not limited to the above described example but includes any alternative providing equivalent means to carry out the mutual approach or separation between the seats of the bead wires and the corresponding side walls of the drum.

What is claimed is:

1. A tire building drum comprising a main shaft having two shaft portions telescopically slidable with respect to each other, a sleeve fixed on the outer end of each shaft portion, each sleeve having an upstanding annular flange, a tubular diaphragm having its ends anchored in fluid tight relation to the outer faces of said flanges, a rigid ring coaxially and slidably mounted on each sleeve and disposed inwardly of and in close proximity to an adjacent flange, said rigid ring being provided with a seat receiving an annular inflatable air tube and an elastic ring surrounding said air tube, each elastic ring having on its outer peripheral surface a circumferential groove, said elastic ring being expansible from a diameter less than that of the rigid ring to a diameter greater than the diameter of the rigid ring, and means for displacing each rigid ring along its corresponding sleeve in directions towards and away from the adjacent flange, the displacement of said rings being independent of any movement of said adjacent flange.

2. The tire building drum as defined by claim 1, said means including a series of set screws axially disposed at intervals in corresponding threaded holes extending through each of said flanges, the inner ends of said set screws engaging said rigid rings for displacing each ring along said corresponding sleeve in a direction inwardly of said adjacent flange.

3. The building drum as defined by claim 1, said means including a series of draw screws axially disposed at intervals locked to the outer sides of said rigid rings and passing through holes provided in said flanges, and a draw nut on the outer end of each draw screw and bearing against said outer face of said flanges for displacing each rigid ring towards its adjacent flange.

References Cited in the file of this patent

UNITED STATES PATENTS

| | | |
|---|---|---|
| 2,084,009 | Sohl | June 15, 1937 |
| 2,754,886 | Bishop | July 17, 1956 |
| 2,986,196 | Frazier | May 30, 1961 |
| 3,014,521 | Barber | Dec. 26, 1961 |

FOREIGN PATENTS

| | | |
|---|---|---|
| 463,422 | Canada | Feb. 28, 1950 |